June 28 1932.  G. E. PELLISSIER  1,865,042
BRAKE FOR MOTOR VEHICLES
Filed Dec. 22, 1928
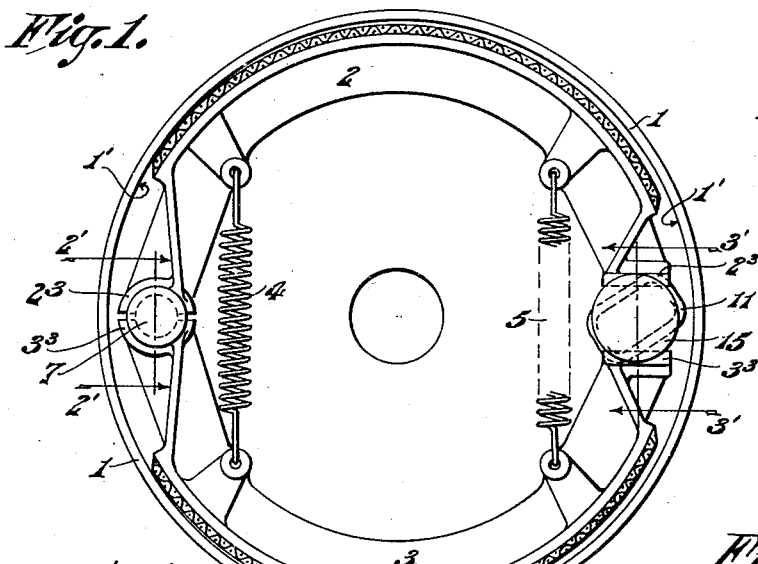
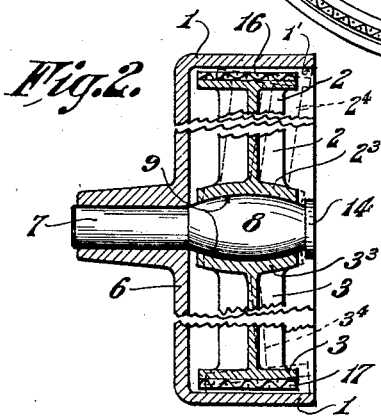
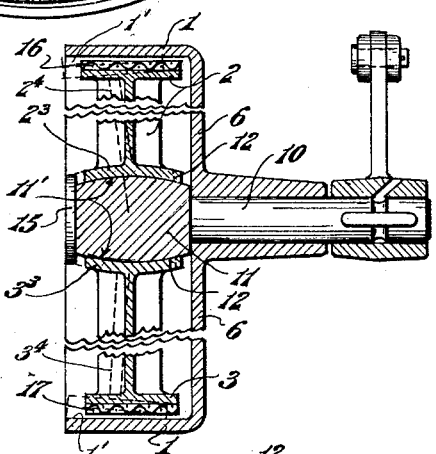
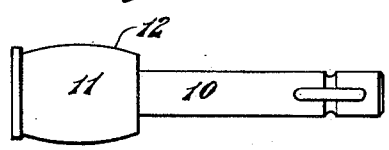
INVENTOR,
George E. Pellissier,
BY
Harry W. Bowen,
ATTORNEY.

Patented June 28, 1932

1,865,042

UNITED STATES PATENT OFFICE

GEORGE E. PELLISSIER, OF HOLYOKE, MASSACHUSETTS

BRAKE FOR MOTOR VEHICLES

Application filed December 22, 1928. Serial No. 327,999.

This invention relates to improvement in the construction of brakes for motor vehicles. It is particularly designed for use in connection with the rotating brake drum of the motor wheel to which the drum is attached in the usual way.

The primary object of the present invention is to provide a mounting for a pair of brake shoes, to which the brake linings are attached, so that when the brake operating cam is turned into a position for moving the brake shoes outward they will, at the same time, automatically rock or turn transversely on their supporting pin and operating cam, whereby the braking surfaces of the linings will automatically engage the inner surface of the drum throughout the entire widths of the brake lining. This construction therefore permits the entire width of the lining to be utilized. At the present time many brake constructions utilize only a portion of the brake lining, thus destroying the braking efficiency. In order to permit the brake bands to oscillate or tip laterally on their supporting pin and the operating cam it is necessary that the supporting pivot pin and this cam each be formed with a curve that extends lengthwise of the pin and cam.

Further objects and nature of the invention will be set forth in the body of the specification, with reference to the drawing and appended claims.

Referring to the drawing:

Fig. 1 is a vertical sectional view showing the interior construction of the brake mechanism that is located within the brake drum, together with the supporting pin and operating cam for the brake shoes.

Fig. 2 is a sectional view on the line 2'—2' of Fig. 1 showing the upper and lower brake shoe and the supporting pivot pin on which the adjacent ends of the shoes rest.

Fig. 3 is a vertical sectional view on the line 3'—3' of Fig. 1 illustrating the curved cam surface on which the adjacent hub ends of the shoes 2 and 3 rest, together with the crank arm that is secured to the cam carrying shaft which operates the shoes when the brakes are applied.

Fig. 4 is a detailed view of the cam shaft removed.

Fig. 5 is a view of Fig. 4 looking from the right.

Referring to the drawing in detail:

1 designates the usual brake drum, 2 and 3 the upper and lower brake shoes which are normally drawn toward each other by means of the contractile coiled springs 4 and 5. 6 designates the enclosing housing, or casing, of the brake mechanism in which is fixedly secured the rear pivot pin 7. This pin is formed with a curved surface 8. The adjacent hub ends of the shoes 2 and 3 are also formed with a curved surface 9 which corresponds with the radius of curvature of the surface 8 of the pin 7.

10 designates the rockable shaft which is formed with the cam part 11 that is located between the adjacent front hub ends of the cam shoes 2 and 3 for operating the same. These hub ends are formed with the curved surface or seats 11'. The cam 11 is formed with the longitudinal curved surface 12 which corresponds with the radius of curvature of the curved surface 8 of the pin 7. This construction permits the shoes 2 and 3 to tip laterally or transversely of the axis of the brake drum. Or in other words to move into planes that are located at an angle to the driving shaft of the vehicle. The normal position of the cam 11 is shown in Figs. 1 and 3.

The shaft 7 is formed with a guard plate 14 and the shaft 10 with a corresponding plate 15 which serves to retain the hub ends of the brake shoes in their operative positions on the pin 7 and cam 11. Or, in other words to prevent displacement of the hub parts $2^3$ and $3^3$. This construction permits the entire or outer contact surfaces of the brake linings 16 and 17 to engage the inner braking surface of the brake drums throughout their entire width, thus permitting the linings to wear uniformly across their outer surfaces as shown in their normal positions in full lines in Figs. 2 and 3. When the cam 11 is operated the hub ends of the shoes will turn on the pin 7 at their left hand ends and also will be forced outward by the cam 11. At the same time the shoes are permitted to freely oscillate laterally on the curved surfaces 8 and 12 respectively, of the pin 7 and cam 11. Thus automatically seating the lining throughout its entire width on the brake drum.

The dotted lines 2⁴ and 3⁴ in Figs. 2 and 3 indicate the tipped positions of the brake shoes 2 and 3, when the linings 16 and 17 are not in parallel relation to the inner surface of the brake drum. When the brakes are applied the hub ends 2³ and 3³ will move on the curved surfaces 8 and 12 permitting the linings 16 and 17 to automatically seat throughout their full width on the inner braking surface 1' of the brake drum 1, thus utilizing the full width of the linings.

It will of course be observed that the hub ends are formed with two curved surfaces that are at right angles to each other.

From this description it will be seen that I have provided a mounting for brake shoes that will move both vertically and transversely of the brake drum.

What I claim is:

1. A brake mechanism comprising in combination with a braking drum, a pair of shoes in the drum, the opposite ends of which shoes are formed with curved surfaces located at right angles to each other, one curved surface being to permit the brake shoes to rise and fall in the drum in a vertical plane and the other curve to permit the shoes to tip laterally of the drum, a supporting pin having an operating cam with curved surfaces corresponding with the curvature of the ends at the opposite ends of the brake shoes.

2. A brake mechanism for motor vehicles having in combination with an enclosing casing, a pin secured to the casing and formed with a longitudinally extending curved surface, a pair of brake shoes the adjacent ends of which are formed with curvatures which correspond with the radius of curvature of the pin, the opposite ends of the brake shoes being formed with transversely curved surfaces, an operating cam having a longitudinally extending curved surface which corresponds with the said curvature of the curved surface of the pin and cam, the construction and arrangement being such that the two shoes will automatically seat on the inner surface of the brake drum throughout their width.

3. A brake construction comprising in combination with an enclosing housing, a pair of brake shoes, a pivot pin having a longitudinally extending curved surface for supporting one end of each of the brake shoes, which are formed with a correspondingly shaped surface and a cam shaft with cam having a longitudinally extending curved surface for supporting the opposite ends of the brake shoes, having correspondingly shaped surfaces, the bearing hub surfaces of the brake shoes being in engagement with the pivot pin and cam respectively and operating to permit the brake shoes to oscillate transversely of the braking surface of the brake drum when the brakes are applied for automatically causing the entire width of the brake lining to engage the inner braking surface of the drum.

GEORGE E. PELLISSIER.